United States Patent [19]
Edwards

[11] Patent Number: 6,085,505
[45] Date of Patent: Jul. 11, 2000

[54] INDUSTRIAL VEHICLE WITH ADJUSTABLE BOOM MEMBERS

[75] Inventor: John W. Edwards, Sarasota, Fla.

[73] Assignee: Advanced Contracting and Hedging, Inc., Sarasota, Fla.

[21] Appl. No.: 09/127,849

[22] Filed: Aug. 3, 1998

Related U.S. Application Data

[63] Continuation-in-part of application No. 08/547,455, Oct. 24, 1995, Pat. No. 5,832,706.

[51] Int. Cl.[7] ............................ A01P 34/52; A01D 34/73; A01G 3/04; B62B 1/06; B66C 23/42

[52] U.S. Cl. ................................ 56/15.2; 56/233; 56/235; 56/255; 56/319; 414/444; 212/300; 172/216

[58] Field of Search ..................................... 56/15.1, 15.2, 56/235, 238, 255, 295, 315, 319, 320, DIG. 17, 233; 414/444; 37/403; 172/215, 216; 212/300

[56] References Cited

U.S. PATENT DOCUMENTS 3,032,956 5/1962 Mullet .
3,061,996 11/1962 Ripps .

(List continued on next page.)

FOREIGN PATENT DOCUMENTS 2-309-458 2/1973 Germany .
313674 12/1971 U.S.S.R. .

OTHER PUBLICATIONS

TH–1100–LHedger Brochure, TOL, Inc.
HS 750 Hedger Brochure, Universal Pruning Machine, TOL, Inc.
Photograph A—Trailer Mounted Dual Boom Hedger; Citris Systems Inc.
Photograph B—Rotably Mounted Arm with Overlapping Blades—Bancroft Citrus Enterprises.
Photograph C—Trailer Mounted Topping Hedger.
Photograph DG—Topping Hedger Having Blades Mounted on Triangular Platforms.
Photograph H—Topping Hedger Having Three Point Star Wheel—Jimmy Hern.
Photograph I–L—Dual Boom Hedger—Citrus, Inc.
HD 1600 Dual Boom Hedger Brochure; TOL Incorporated.
HD 1600 K Dual Boom Hedger Brochure and Price List; TOL Incorporated.
HD 2200 Dual Boom Hedger Brochure and Price List; TOL Incorporated.
140G Motor Grader Brochure; CAT.

*Primary Examiner*—Eileen Dunn Lillis
*Assistant Examiner*—Gary S. Hartmann
*Attorney, Agent, or Firm*—Oliff & Berridge, PLC

[57] ABSTRACT

An industrial vehicle includes a frame, a motive device mounted on the frame, a platform mounted on the frame adjacent to the motive device, a main boom member associated with an industrial implement, the main boom member being coupled to the platform, and at least one secondary boom member attached to the main boom member. The industrial vehicle may comprise in one embodiment tilting structure that tilts the platform about an axis substantially perpendicular to a driving direction of the vehicle, or at least one pivot defining at least one axis about which the main boom member and/or the secondary boom member pivot, the at least one axis being substantially perpendicular to a driving direction of the vehicle. A linkage may be provided that pivots at least one of the main boom member and the at least one secondary boom member about an axis substantially perpendicular to a driving direction of the vehicle. The pivot and/or linkage may be provided to individual ones of the main boom member and the secondary boom member. If the secondary boom member includes two secondary boom members, then the pivot can be provided to pivot one or both of the secondary boom members.

19 Claims, 16 Drawing Sheets

U.S. PATENT DOCUMENTS

| | | |
|---|---|---|
| 3,087,296 | 4/1963 | Cowles . |
| 3,116,583 | 1/1964 | Mason . |
| 3,136,106 | 6/1964 | Joslin . |
| 3,138,911 | 6/1964 | Pounds . |
| 3,192,695 | 7/1965 | Leydig et al. . |
| 3,246,460 | 4/1966 | Patterson et al. . |
| 3,263,516 | 8/1966 | Chisholm . |
| 3,319,407 | 5/1967 | Jordan et al. . |
| 3,343,575 | 9/1967 | Trout . |
| 3,418,790 | 12/1968 | Whitfield et al. . |
| 3,559,385 | 2/1971 | Eaton . |
| 3,624,698 | 11/1971 | Storm . |
| 3,653,193 | 4/1972 | Conghran, Jr. . |
| 3,785,705 | 1/1974 | Binger et al. . |
| 3,845,921 | 11/1974 | Thompson et al. ................ 244/158 |
| 3,852,945 | 12/1974 | Berry et al. . |
| 3,949,539 | 4/1976 | Cartner . |
| 3,952,783 | 4/1976 | Windsor . |
| 4,063,359 | 12/1977 | Luscombe . |
| 4,121,777 | 10/1978 | Kolstad et al. . |
| 4,168,008 | 9/1979 | Granryd ............................ 212/144 |
| 4,241,565 | 12/1980 | Parsons, Jr. . |
| 4,302,922 | 12/1981 | Guerndt, Jr. et al. . |
| 4,323,009 | 4/1982 | Voigt . |
| 4,350,190 | 9/1982 | McColl . |
| 4,353,275 | 10/1982 | Colville . |
| 4,355,497 | 10/1982 | Murphy . |
| 4,411,070 | 10/1983 | Boyum et al. . |
| 4,445,557 | 5/1984 | Peters, III . |
| 4,502,269 | 3/1985 | Cartner . |
| 4,509,315 | 4/1985 | Giguere . |
| 4,707,971 | 11/1987 | Forpahl et al. . |
| 4,773,455 | 9/1988 | Lessard . |
| 4,775,287 | 10/1988 | Hering, Sr. . |
| 4,832,412 | 5/1989 | Bertrand . |
| 4,887,417 | 12/1989 | Parsons, Jr. . |
| 4,901,508 | 2/1990 | Whatley . |
| 5,031,389 | 7/1991 | Yawn et al. . |
| 5,133,174 | 7/1992 | Parsons, Jr. . |
| 5,209,049 | 5/1993 | Heard . |
| 5,210,997 | 5/1993 | Mountcastle, Jr. . |
| 5,226,776 | 7/1993 | Vestergaard ............................ 414/680 |
| 5,341,629 | 8/1994 | Penner . |
| 5,404,660 | 4/1995 | Webster ................................ 37/189 |
| 5,430,999 | 7/1995 | Grant . |
| 5,438,819 | 8/1995 | Dallman . |
| 5,622,035 | 4/1997 | Kando et al. . |
| 5,640,836 | 6/1997 | Lingenfelt . |

75

INDUSTRIAL VEHICLE WITH ADJUSTABLE BOOM MEMBERS

This is a Continuation-in-Part of application Ser. No. 08/547,455 filed Oct. 24, 1995 now U.S. Pat. No. 5,832,706. The entire disclosure of the prior application is hereby incorporated by reference herein in its entirety.

BACKGROUND OF THE INVENTION

1. Field of Invention

The present invention relates to an industrial vehicle including adjustable boom members and, more particularly, to a hedger/cutting unit that includes an expanded cutting area and multiple cutting configurations for the boom members.

2. Description of Related Art

Paths and roads cut along tree lines often become obstructed by growing vegetation. The hedging apparatus or cutting unit can be used to hedge the growing trees and to clear the road or path.

Conventional hedgers include a plurality of rotating cutting blades fixed to a stationary or rotating cutting blade arm. The cutting blade arm may be controllably attached to an industrial vehicle for numerous cutting operations, including topping, skirting and hedging.

The conventional devices, however, generally have a limited cutting area. Moreover, the conventional devices generally have a single blade supporting arm, limiting the configurations of the blades. Still further, conventional hedgers lack structure enabling cutting over obstacles, e.g., to select individual limbs for cutting, and lack structure enabling multiple blade configurations.

SUMMARY OF THE INVENTION

It is therefore an object of the present invention to provide an industrial vehicle or a hedger/cutting unit having a blade coupling unit that overcomes the deficiencies of conventional hedgers. In particular, it is an object of the invention to provide a hedger/cutting unit that is extendible above and over obstacles, that includes structure enabling multiple blade configurations, that can select individual limbs for cutting and/or that can more efficiently cover a greater cutting area in a single pass.

These and other objects and advantages of the invention are achieved by providing an industrial vehicle comprising a frame, a motive device mounted on the frame, a platform mounted on the frame adjacent to the motive device, a main boom member associated with an industrial implement, a main boom member being coupled to the platform, and tilting structure that tilts the platform about an axis substantially perpendicular to a driving direction of the vehicle. The industrial vehicle may further include a lifting structure that moves the platform between raised and lowered positions with respect to the frame.

According to other embodiments of the invention, an industrial vehicle includes a frame, a motive device mounted on the frame, a platform mounted on the frame adjacent to the motive device, a main boom member associated with an industrial implement, the main boom member being coupled to the platform, at least one secondary main boom member attached to the main boom member, and at least one pivot defining at least one axis about which at least one of the main boom member and the at least one secondary boom member pivot, the at least one axis being substantially perpendicular to a driving direction of the vehicle. The pivot may be provided to the main boom member and/or the at least one secondary boom member. If the at least one secondary boom member comprises first and second secondary boom members, then the pivot can be provided to one or both of the first and second secondary boom members.

According to yet another embodiment of the present invention, an industrial vehicle comprises a raisable platform, a main boom member associated with an industrial implement, the main boom member being coupled to the platform, at least one secondary boom member connected to the main boom member, and a linkage that pivots at least one of the main boom member and the at least one secondary boom member about an axis substantially perpendicular to a driving direction of the vehicle.

According to still another embodiment of the present invention, an industrial vehicle comprises a platform, a main boom member having proximal end coupled to the platform, at least one secondary boom member connected to a distal end of the main boom member, and a pivot positioned on the main boom member between the distal and proximal ends of the main boom member, said pivot allowing the distal end of the main boom member to pivot about an axis substantially parallel to a driving direction of the vehicle.

These and other objects of the present invention are described in or apparent from the following detailed description of preferred embodiments.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
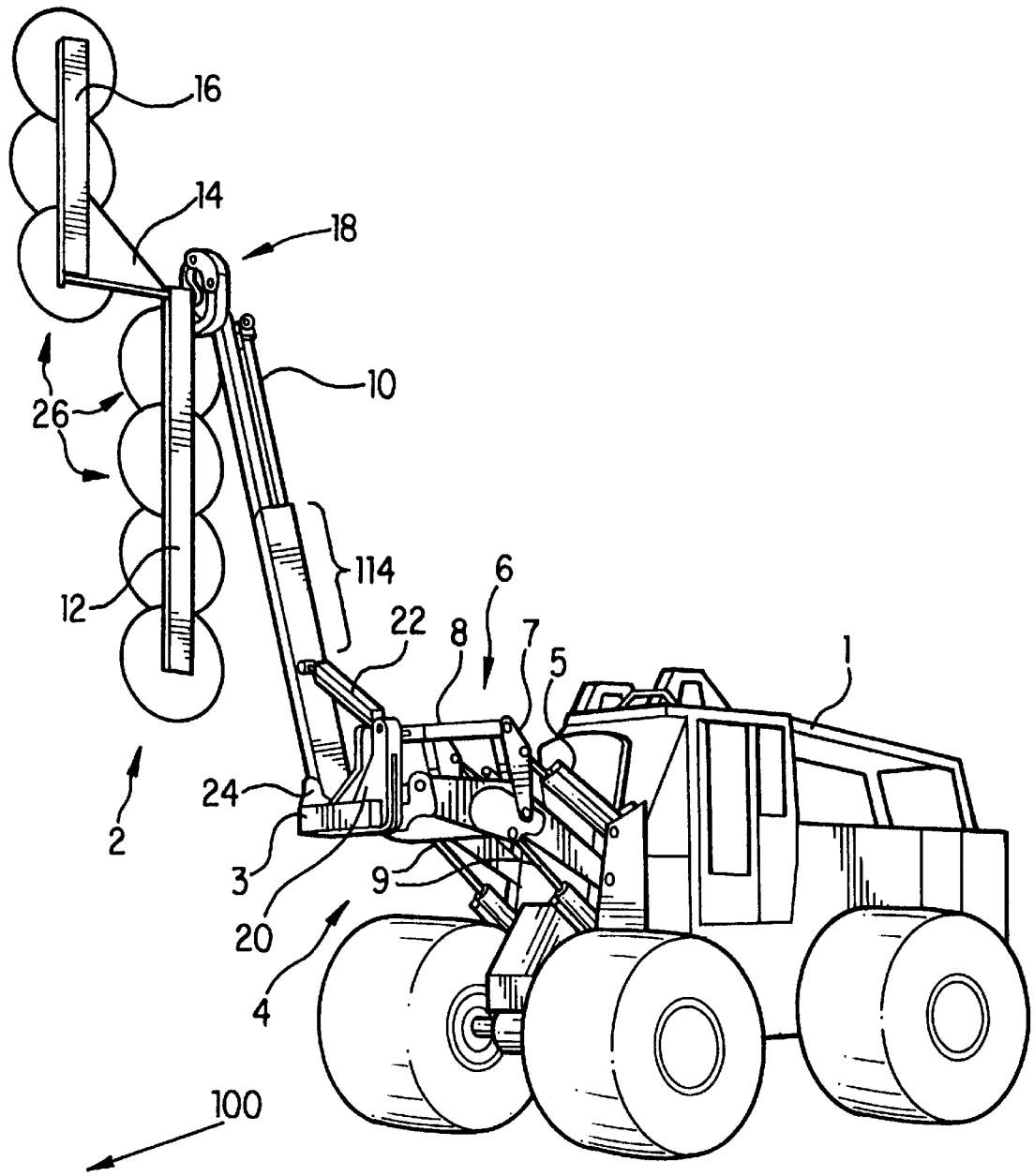
FIG. 1 is a perspective view of the hedger according to the present invention.

The invention will be described with reference to FIGS. 1–10. Referring to FIG. 1, an industrial vehicle 1 includes a basic frame having a motive device, e.g., a motor, and is fitted with a tool, for example, a cutting unit 2 for hedging operations. The cutting unit 2 includes a raisable platform 3 that is fixed to a lifting structure 4 of the industrial vehicle 1.

The lifting structure 4 includes a pair of platform tilting cylinders 5 connected to the platform 3 through a tilt linkage 6. The tilt linkage 6 includes a first pivotable bracket 7 extending from the lifting structure 4. The first pivotable bracket 7 is connected to the platform 3 by a second pivotable bracket 8. The lifting structure also includes additional cylinders 9 to provide lifting of the platform 3.

Figure 2:
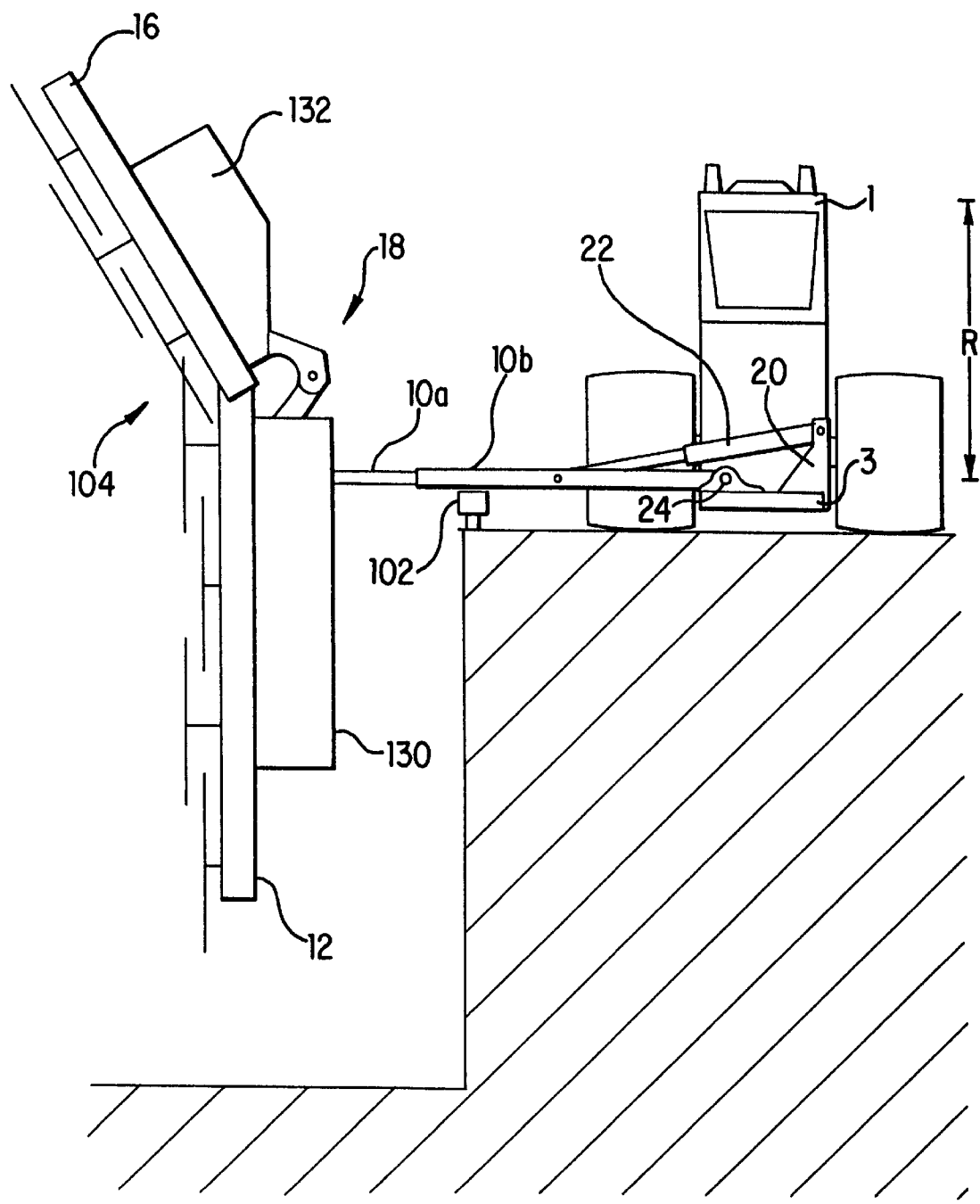
FIG. 2 is a front elevation view of the hedger according to the present invention.

The lifting structure 4 is capable of lifting the platform 3 within a range R between a raised position as shown in FIG. 1 and a lowered position as shown in FIG. 2. (In FIG. 2, details of the lifting structure 4 and the tilt linkage 6 are eliminated for clarity.) Furthermore, the entire platform 3 can be pivoted forwards or backwards about an axis perpendicular to a driving direction 100 of the industrial vehicle 1 over a range of approximately 90°.

A telescoping main boom 10 extends from one side of the platform 3. The telescoping main boom 10 supports a first boom member 12 attached to the main boom 10 at an end thereof. A second boom member 16 is connected to an end portion of the first boom member 12 through a boom member arm 14. The first and second boom members 12 and 16 can also be referred to as secondary boom members. A pivot linkage 18 (described below) enables the second boom member 16 to pivot 180° relative to the first boom member 12.

The platform 3 includes a platform arm 20 extending upward from the platform 3 at a side of the platform 3 opposite from the main boom 10. The telescoping structure of main boom 10 is conventional and therefore not described in detail. FIG. 2 shows an example wherein the telescoping function is provided using a first telescoping member 10a that slides within a second telescoping member 10b.

Mating portions of the first and second telescoping members may be provided with TEFLON® coatings to reduce friction.

A main boom driving cylinder 22 is connected between an upper end portion of the platform arm 20 and the main boom 10. The main boom driving cylinder 22 drives the main boom 10 to pivot about an axis 24. Because the main boom driving cylinder 22 is disposed above the platform by a distance defined by the platform arm 20, the main boom driving cylinder 22 is capable of driving the main boom 10 20 about axis 24 to a substantially horizontal position. See FIG. 2, for example. As a result, the hedger of the present invention, using the telescoping main boom 10, can clear vegetation below the road surface while reaching over obstacles, such as a guard rail 102 on a highway.

Each of the first and second boom members 12, 16 rotatably supports a plurality of cutting blades 26. As illustrated in FIG. 1, the first boom member 12 preferably supports four cutting blades 26, and the second boom member 16 preferably supports three cutting blades 26. The structure for rotating the cutting blades is known and therefore not described in further detail.

As illustrated in FIG. 2, the cutting blades 26 of each boom member are disposed alternatingly in front of and behind one another. The blades are disposed so that they slightly overlap along the boom members in a region 104 where the first and second boom members pivot with respect to one another to form a continuous cutting profile. As a result, no vegetation is missed during hedging regardless of the relative positions of the first and second boom members, and a greater amount of hedging can be accomplished in a single pass. Each of the first and second booms 12, 16 may also be provided with shields 130, 132, respectively, to protect hoses and other portions of the industrial vehicle 1.

The first boom member 12 is pivotable relative to the main boom 10 and the second boom member 16. Similarly, the second boom member 16 is pivotable relative to the first boom member 12 and the main boom 10. The first boom member 12 pivots relative to the main boom 10 over a range of about 180°. To avoid interference of the cutting blades 26 on the second boom member 16 with the cutting blades 26 on the first boom member 12, the second boom member 16 is disposed offset in the vehicle driving direction 100 by a distance defined by the boom member arm 14. The cutting blades 26 of the first and second boom members 12, 16 are substantially vertically aligned in a plane parallel to the vehicle driving direction 100 (FIG. 1). The lowermost cutting blade 26 of the second boom member 16 slightly overlaps the uppermost blade 26 of the first boom member 12 to avoid gaps in cutting the vegetation. In addition to avoiding interference between the cutting blades 26, by disposing the cutting blades 26 of the second boom member 16 offset from the cutting blades 26 of the first boom member 12 by boom member arm 14, debris that is cut by the cutting blades 26 of the second boom member 16 does not get caught in the blades 26 of the first boom member 12.

Figure 1A:
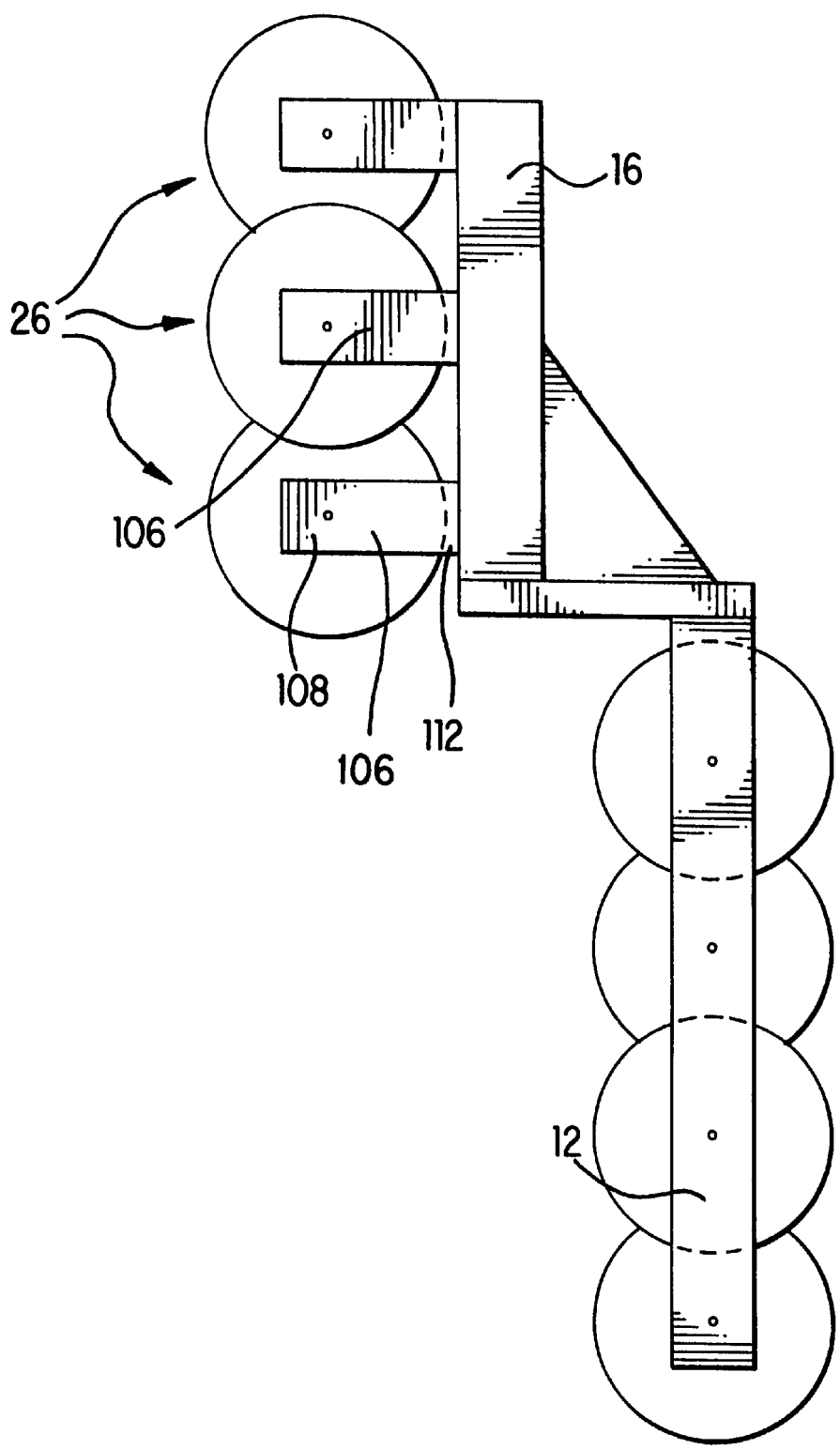
FIG. 1A is a side elevation view of one embodiment of a tubular extension ember.

Furthermore, the blades 26 could be mounted up to 18" away from the second boom member 16 using jibs or finger extensions including, for example, an extension member 106 having a first end 108 that connects to a blade 26 and a second end 112 that connects to the second boom member 16. See FIG. 1A. The extension member 106 is particularly useful for hedging awkwardly shaped limbs so that the blades extend well beyond the main boom, i.e., the blades 26 rather than the boom will contact the vegetation. Additionally, the blades of the first boom member 12 could be provided with jibs or tubular extensions. If jibs are used, an adapter can be provided, or motors (not shown) can be mounted directly on the jib without the need for an adapter.

Furthermore, in accordance with a particularly advantageous aspect of the invention, the hedger can be structured to comport with certification provisions applicable to the Occupational Safety and Health Administration (OSHA). In particular, a portion 114 of the main telescoping boom 10 just above the driving cylinder 22 can be made of an electrically insulating material such as fiberglass or plastic so that electric current that might otherwise be conveyed along the blades to the operator's compartment can be avoided. In addition, any blades that can possibly contact power lines are mounted on a boom member at least partially made of an insulating material such as fiberglass or plastic. Accordingly, the second boom member 16 should be made of an insulating material, and the first boom member can also be made from an insulating material.

Figure 3:
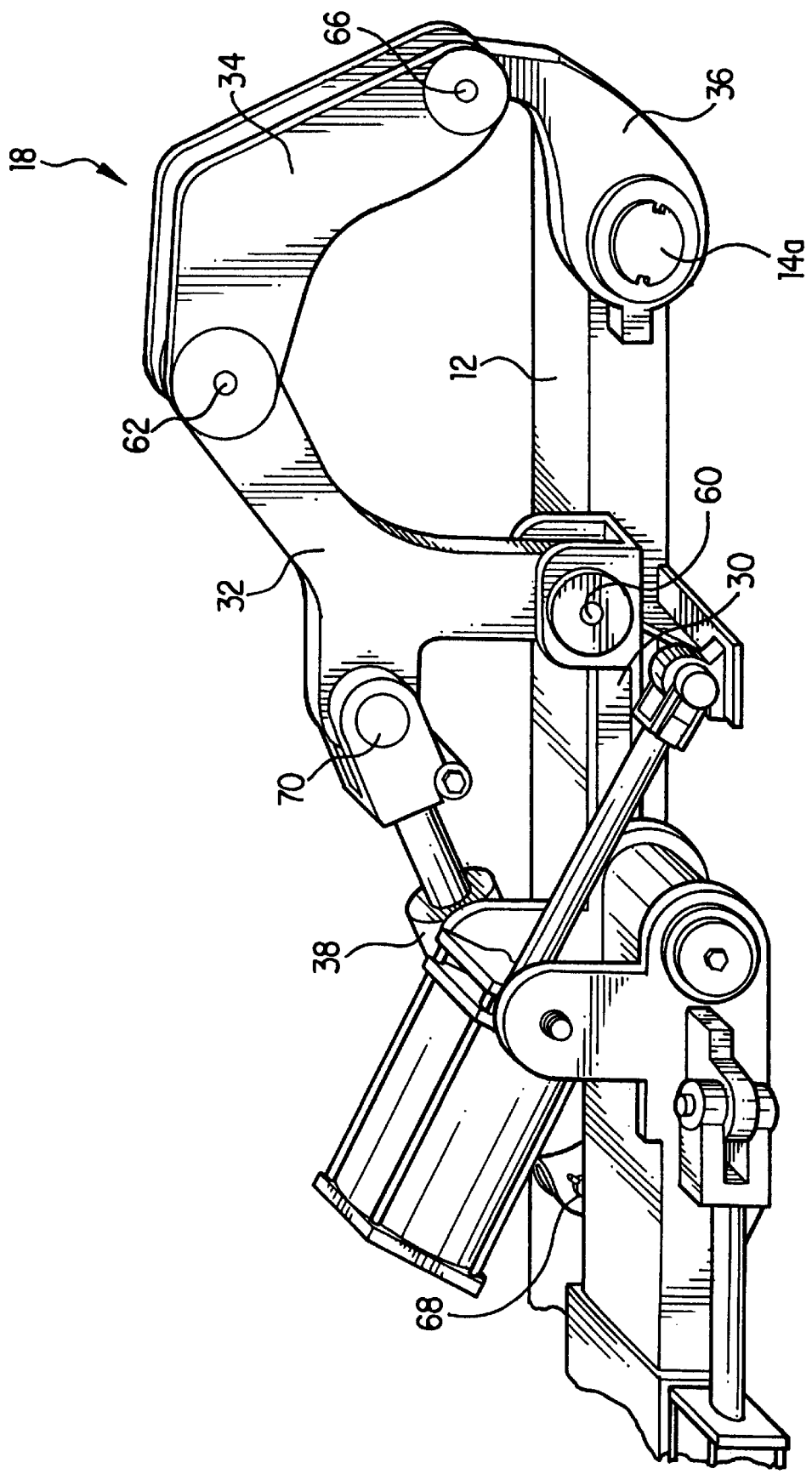
FIG. 3 illustrates a pivot linkage that enables the second boom member to pivot 180° relative to the first boom member.

Referring to FIG. 3, the pivot linkage 18 is configured to enable the second boom member 16 to pivot through 180° relative to the first boom member 12. A fixed portion 30 of the pivot linkage 18 includes two bearing wall members and is fixed to the first boom member 12, for example, by welding. A first linkage arm 32 is inserted between the bearing walls of the fixed portion 30 and is pivotably secured by a pin 60. A second linkage arm 34 is pivotably secured to the first linkage arm 32 at one end by a pin 62. At an opposite end of the second linkage arm 34, the second linkage arm 34 is pivotably attached to a third linkage arm 36 at one end by a pin 66. The third linkage arm 36 is configured to rotate with a rotating axle 14a of the boom member arm 14, which is not illustrated in FIG. 3 for clarity. A driving cylinder 38 is fixed at one end 68 to the first boom member 12 and at an opposite end 70 to an interim portion of the first linkage arm 32. As a result of this structure, the second boom member 16 can be pivoted through 180° relative to the first boom member 12.

Figure 4:
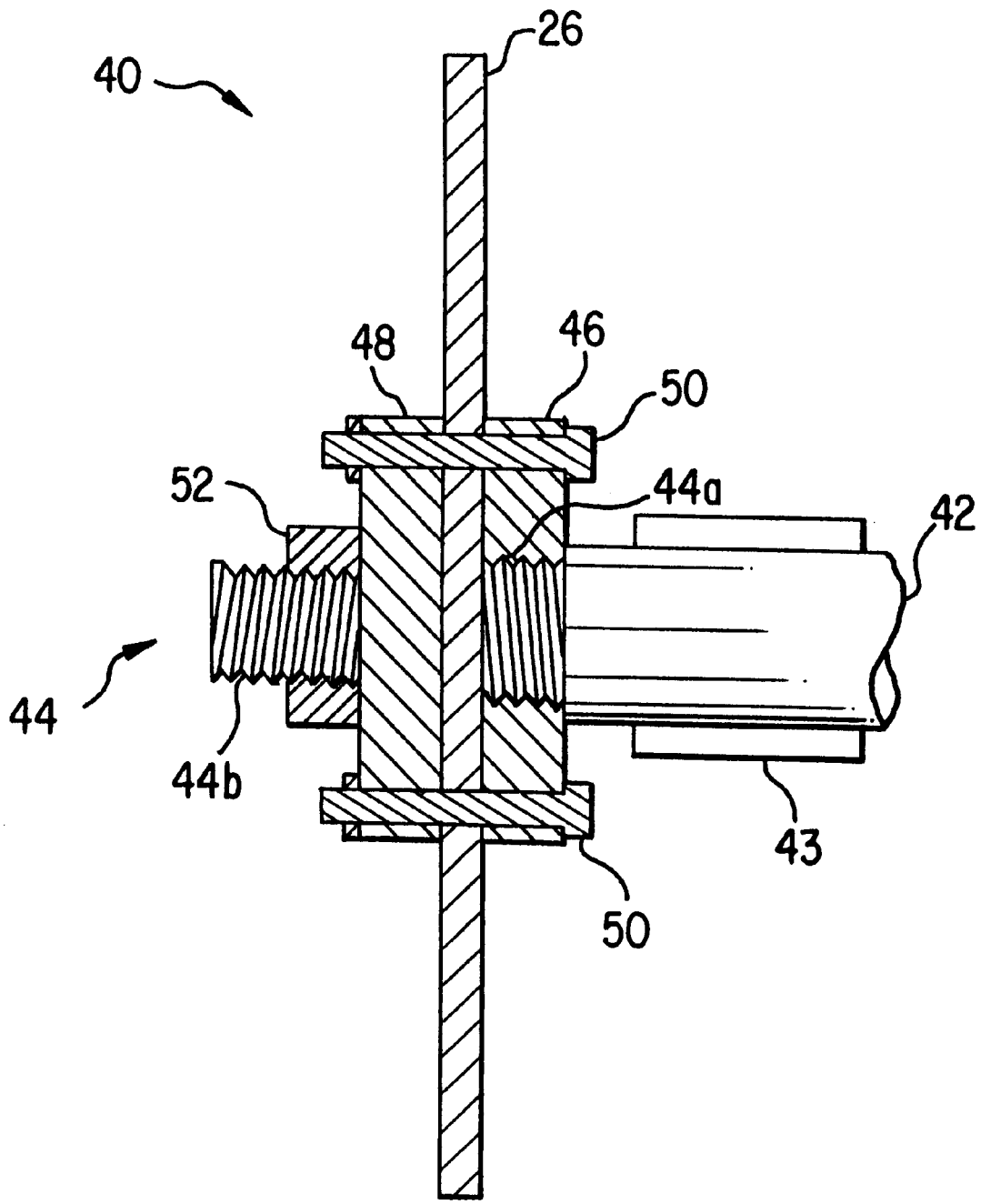
FIG. 4 is a sectional view of the blade coupling unit according to the present invention.
Figure 4A:
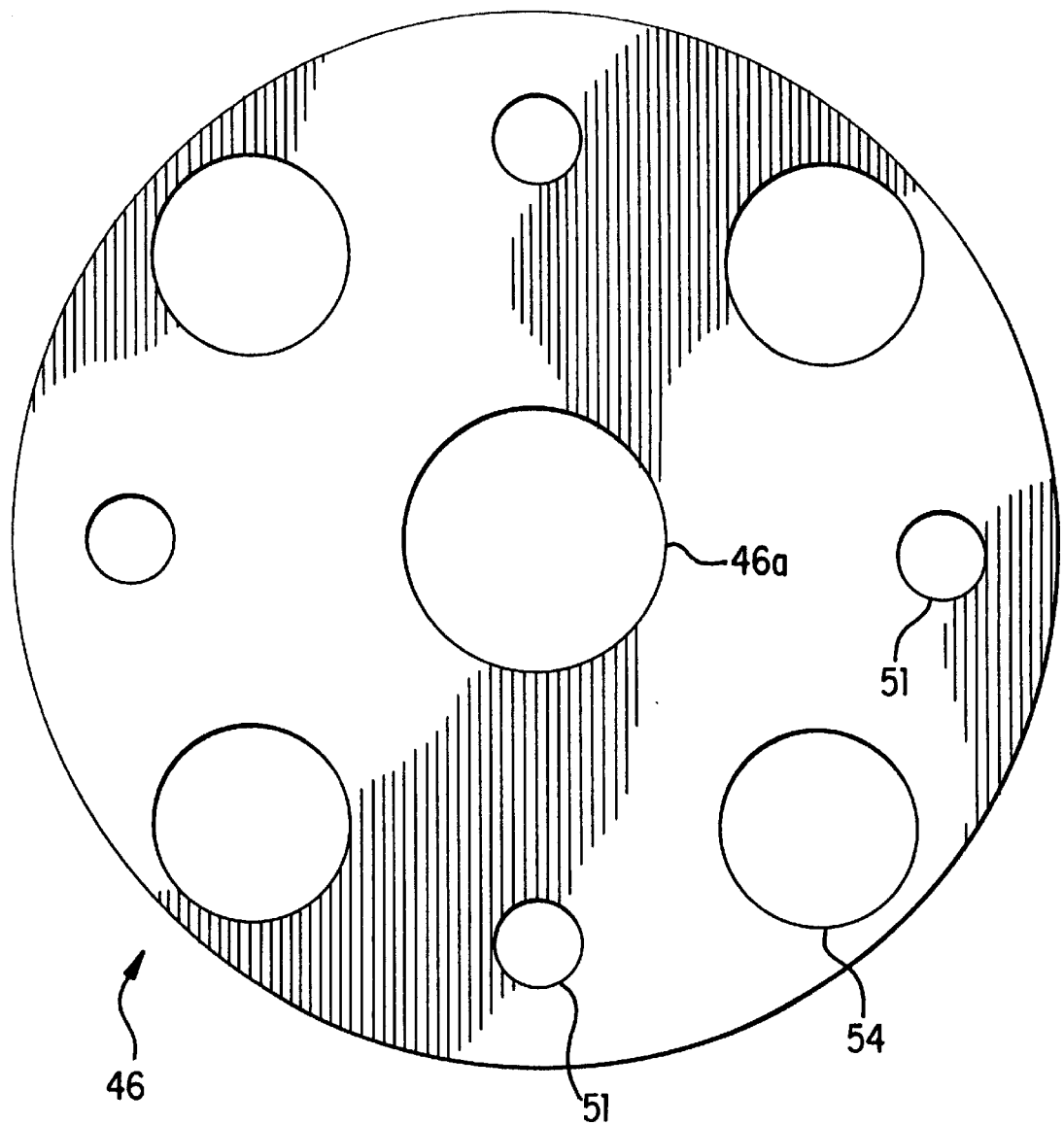
FIGS. 4A and 4B are detail views of, respectively, a back plate and a front plate of the blade coupling unit.
Figure 4B:
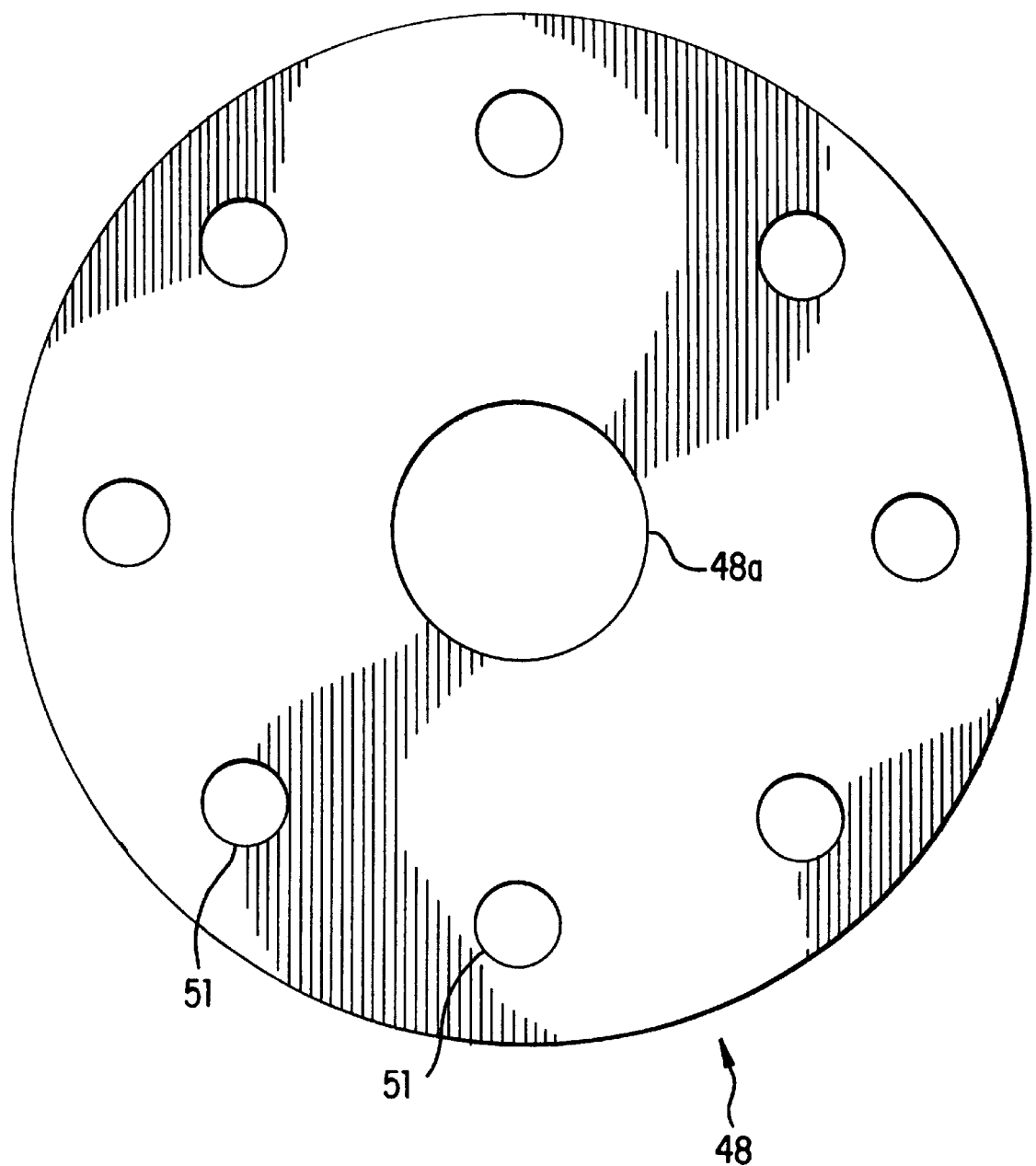

With reference to FIG. 4, each of the cutting blades 26 is fixed to a respective one of the first and second boom members 12, 16 by a blade coupling unit 40. A rotatable blade shaft 42 is rotatably mounted in a bearing 43 and includes a threaded end portion 44. A threaded through hole 46a (FIG. 4A) of a threaded back plate 46 is first threaded on a threaded portion 44a of the rotatable blade shaft 42. The unthreaded cutting blade 26 is fitted over the threaded end portion 44, and an unthreaded through hole 48a (FIG. 4B) of a front plate 48 is fitted over the threaded end portion 44, sandwiching the blade 26 between the back plate 46 and the front plate 48, thus constituting a first locking mechanism. A plurality of bolts 50, preferably four, are extendible through holes 51 in the back plate 46, blade 26 and front plate 48 as a second locking mechanism. A nut 52 is threaded onto portion 44b of the threaded end portion 44 extending outside of the front plate 48. The nut 52 constitutes a third locking mechanism.

The threads of the threaded end portion 44 are configured so that a threaded through hole 46a of the back plate 46 is left-handed threaded on the threaded portion 44a in a direction opposite the rotation direction of the cutting blade, and the nut 52 is right-hand threaded on the threaded portion 44b in the same direction as the rotation direction of the cutting blade 26. As a result, the cutting blade 26 is positively prevented from coming loose during rotation and also in the event of encountering an obstacle that suddenly halts the rotation of the cutting blade 26.

The back plate 46 and front plate 48 are fixed to each other with bolts 50 that extend through four bolt holes 51, as noted above. The front plate may include additional bolt holes (FIG. 4B) to facilitate alignment and to reduce the weight thereof, and the back plate is additionally fitted with a plurality of wrench holes 54, preferably four. See FIG. 4A. The wrench holes are configured to receive a wrench for fixing and removing the back plate 46 to and from the threaded portion 44a of the rotatable blade shaft 42. Moreover, the wrench holes reduce the weight of the back plate 46.

Figure 5A:
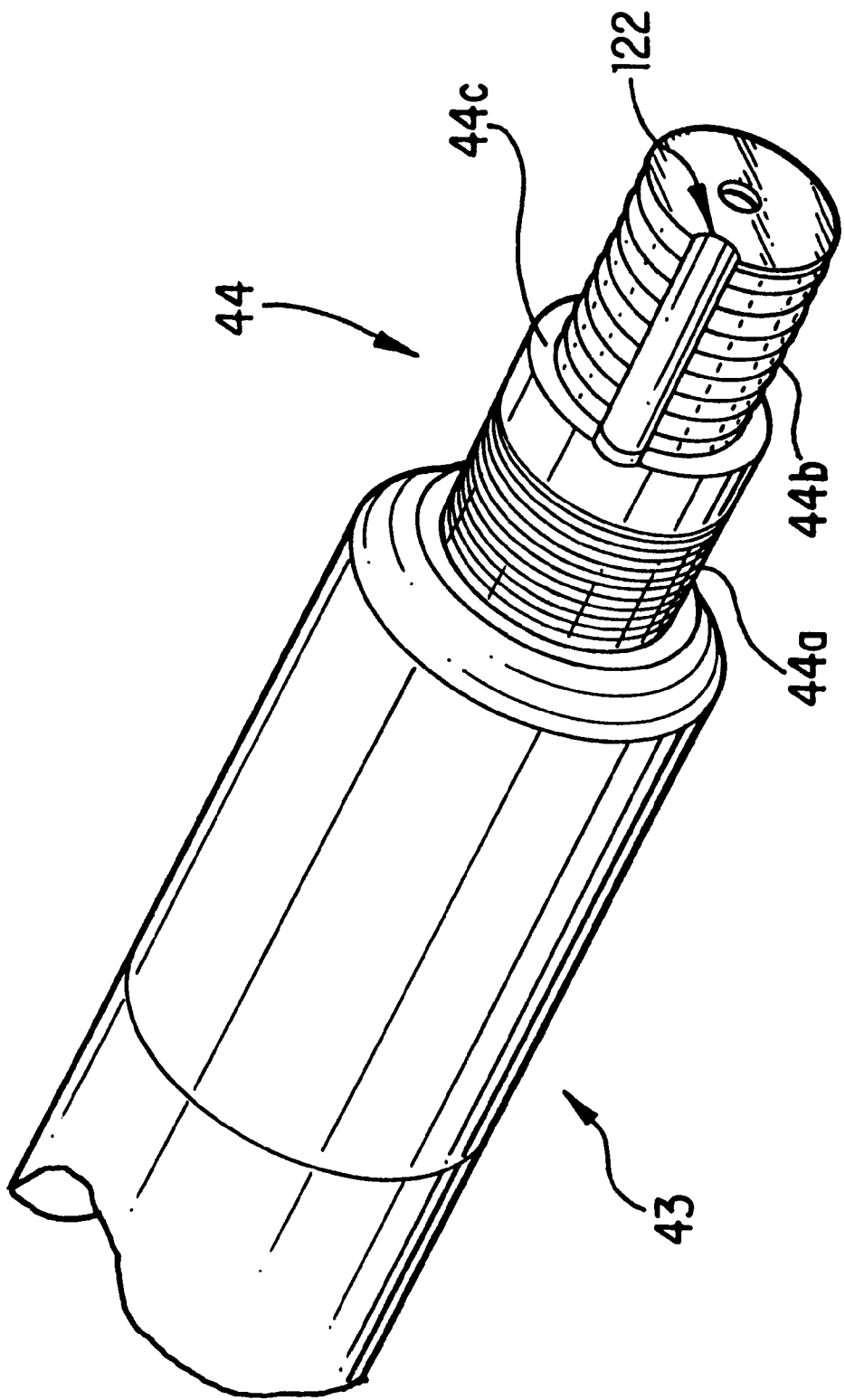
FIG. 5A is a detail perspective view of a rotatable blade shaft of the blade coupling unit.
Figure 5B:
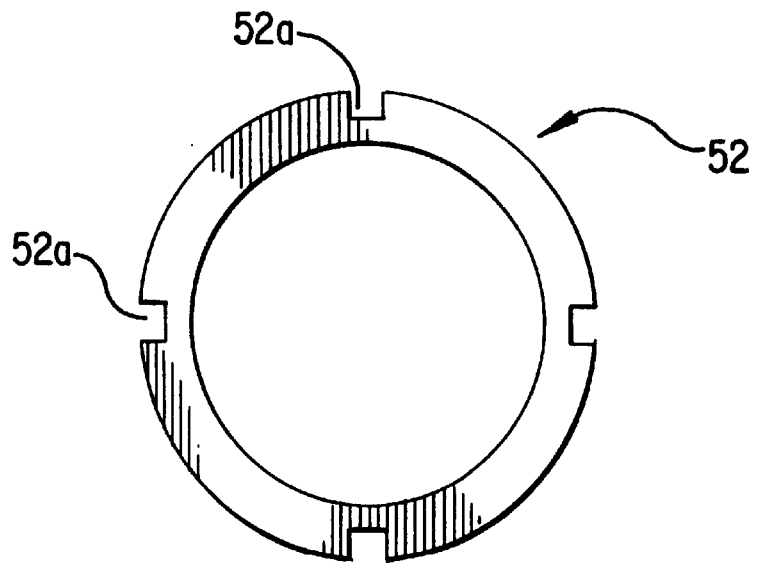
FIGS. 5B and 5C are detail views of, respectfully, a locking nut and a locking washer.
Figure 5C:
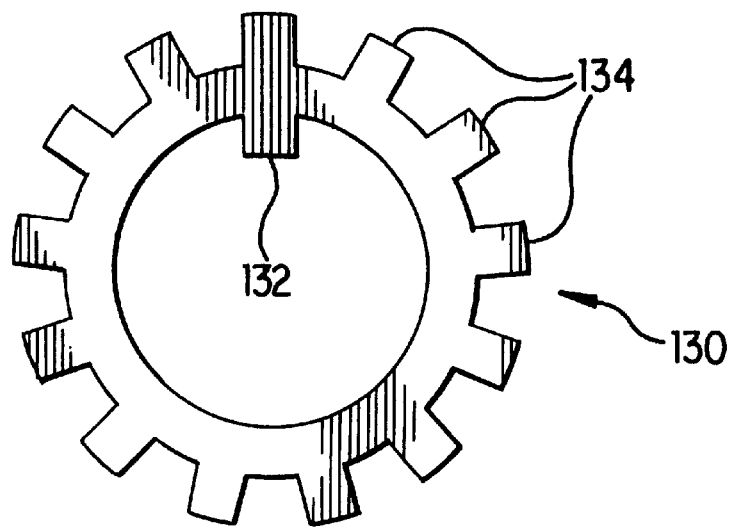

In addition, the shaft 44b may be provided with a groove 122 (FIG. 5A) that cooperates with a locking washer 130 (FIG. 5C). The locking washer 130 includes at least one inwardly oriented tab 132 that is inserted within the groove 122 when the locking washer 130 slides over the shaft 44b to abut the end face 44c of the threaded end portion 44. The locking washer 130 is thus prevented from relative rotative movement with respect to the shaft 42. The threaded nut 52 is tightened on the threaded end 44b after the locking washer 130 is in place. In FIG. 5B, the nut 52 is shown to have a plurality of recesses 52a that cooperate with respective ones of a plurality of outwardly oriented tabs 134 of the locking washer 130. Once the nut 52 is tightened to the shaft 44b, the tabs 134 that are aligned with respective recesses 52a are bent until the tabs 134 positively engage and enter the recesses 52a. Accordingly, the locking washer 130 and the nut 52 are prevented from rotating with respect to the shaft 42. Furthermore, an elongated aperture 118 is provided on shaft 42 in which a set screw is adjustably positioned to engage the shaft 42.

Figure 6A:
FIGS. 6A–6E schematically illustrate different types of cutting profiles.

FIGS. 6A–6E illustrate schematic cutting planes and graphically illustrate the versatility with which the hedger of the present construction can shape vegetation profiles. Basically, the hedger can cut continuous vegetation profiles depending on the characteristics of the vegetation and the surrounding landscape. For example, if a single plane vertical wall is desired, the cutting arms 12 and 16 are substantially vertically aligned and the vegetation can be hedged in the shape of a vertical planar wall (FIG. 6A). Similarly, the arms 12 and 16 can be substantially horizontally aligned (FIG. 6D) to form the vegetation to have a horizontally planar profile.

Figure 6B:
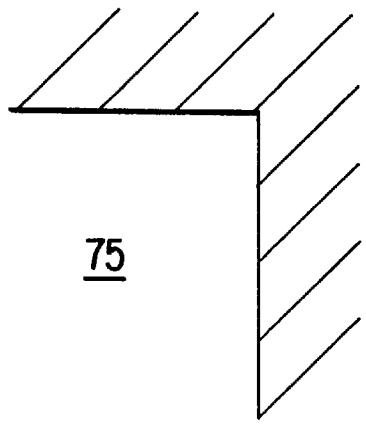
Figure 6C:
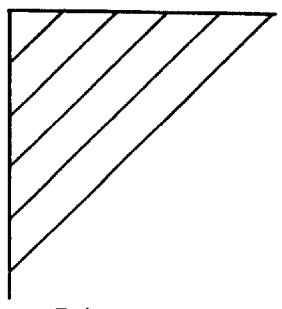
Figure 6D:
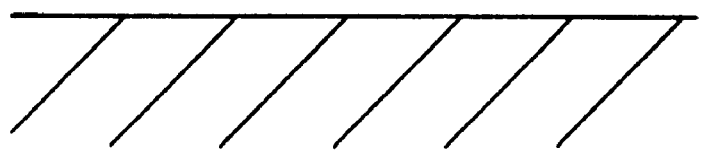
Figure 6E:
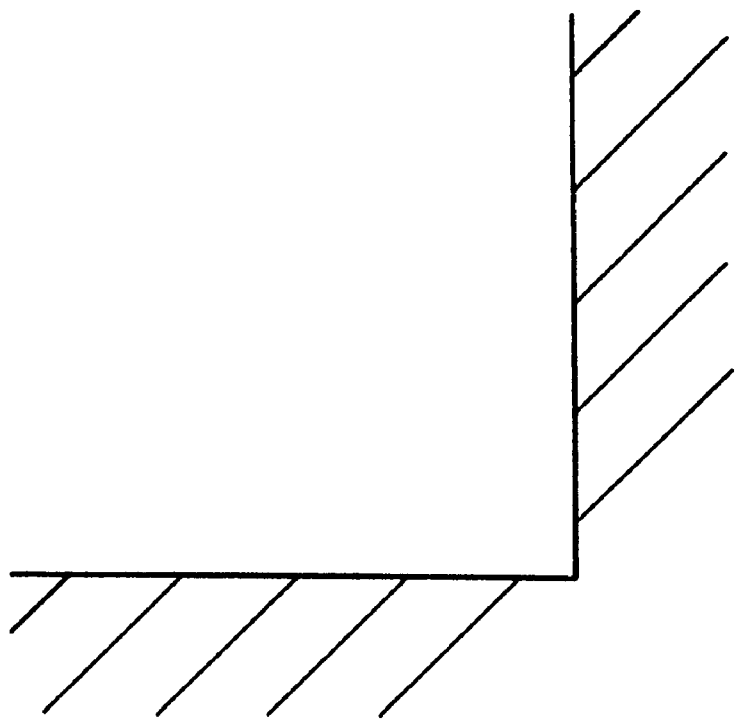

The blades of the first and second boom members 12 and 16, through pivot linkage 18, can also be arranged to form the profile in FIG. 6B in which a passageway 75 is formed, and to form the profile shown in FIG. 6C, which is desirable to cut vegetation below power lines. Additionally, the first boom member 12 can be substantially horizontal while the second boom member 16 can extend vertically upward or at an angle from the first boom member 16, as shown in FIG. 6E (and FIG. 2). In FIGS. 6B, 6C and 6E, the respective cutting planes are substantially perpendicular to each other, but other cutting angles are, of course, also possible. In addition, the multiplanar cutting profiles are also continuous as a result of the overlapping relation of the blades in the region 104, as described above in connection with FIG. 2.

Figure 7:
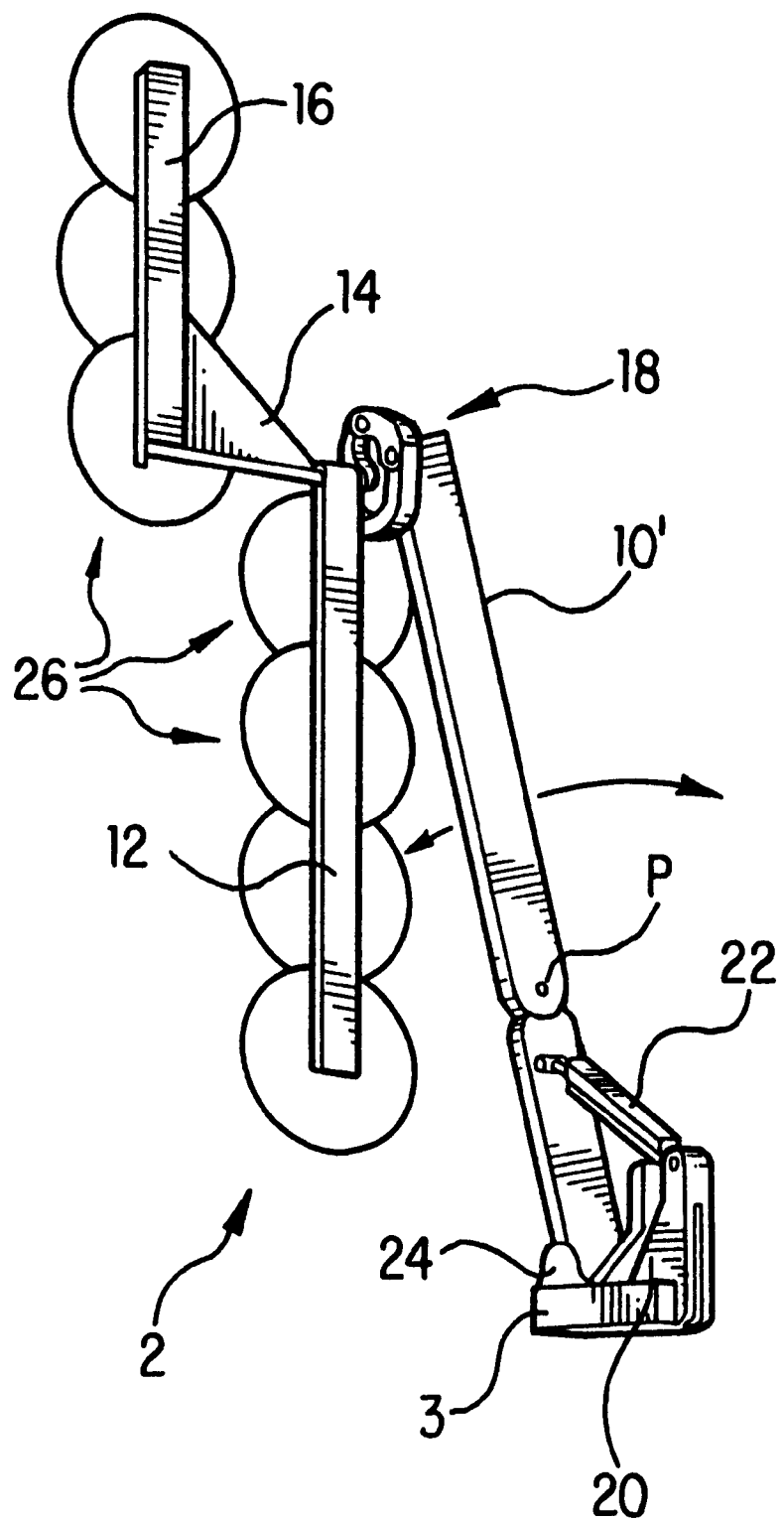
FIGS. 7–11 illustrate alternative embodiments of the present invention.

FIG. 7 through 11 illustrate alternative embodiments of the present invention showing various features that can be used independently or together with the other embodiments. The boom assembly shown in FIG. 7 is similar to that shown in FIG. 1, only the telescoping main boom 10 of FIG. 1 is replaced with a non-telescoping main boom member 10'. In addition, the main boom member 10' can pivot about a pivot point P which defines an axis that is substantially perpendicular to a driving direction 100 (FIG. 1) of the vehicle. The pivot P allows the main boom member 10' to be pivoted back and forth over a range of about 90° as indicated by the arrows shown in FIG. 7. A suitable linkage (not shown) can be used to effect such pivoting movement. By pivoting the main boom member 10' about the pivot P, the first and second boom members 12 and 16 (and in particular the second boom member 16) can be pivoted to target individual limbs or other objects to be cut. Moreover, the embodiment of FIG. 7 can eliminate the need to make the platform 3 tiltable about an axis perpendicular to the driving direction of the vehicle.

Figure 8:
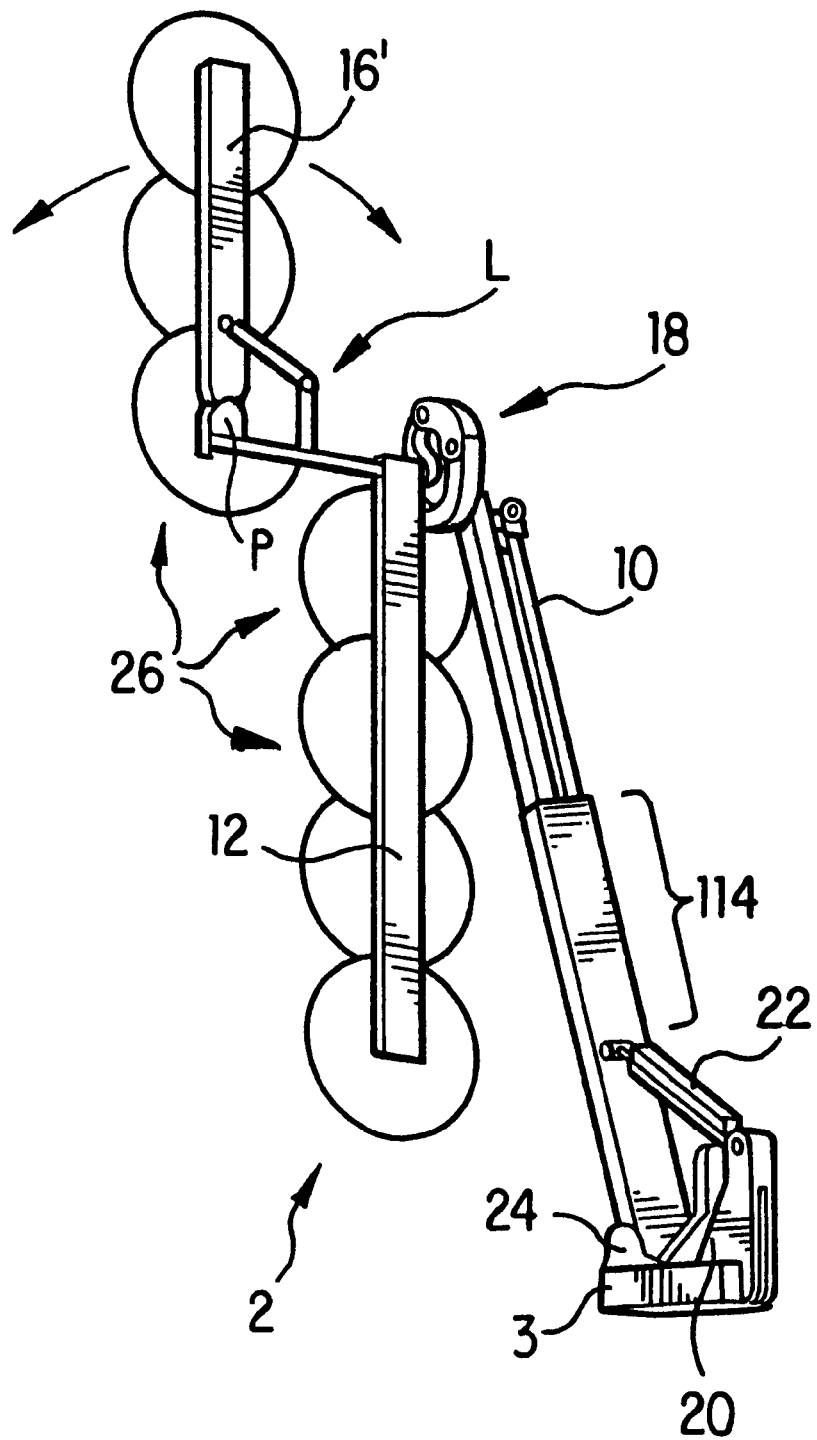
Figure 9:
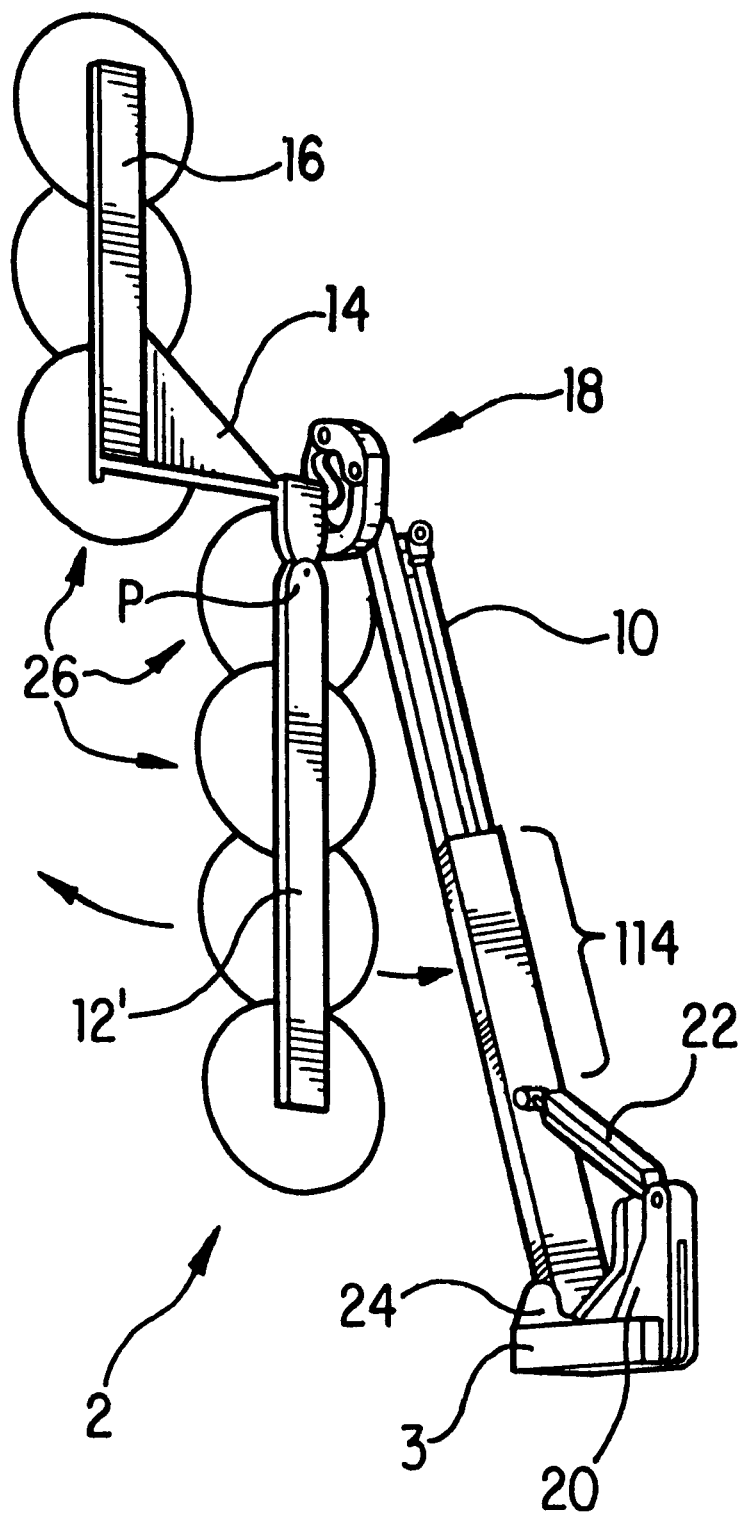
Figure 10:
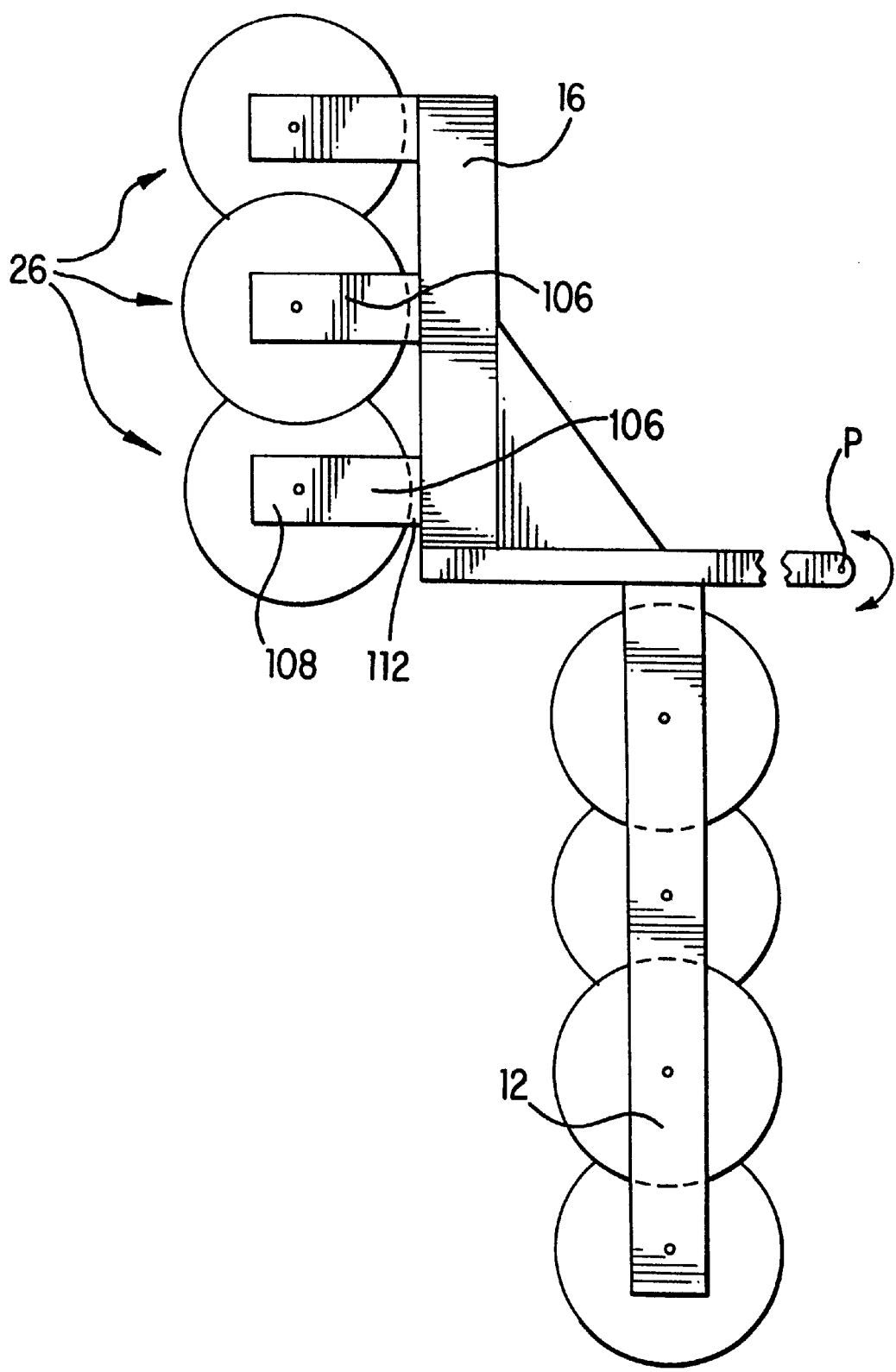

FIGS. 8–10 show other embodiments in which various ones of the main boom member, the first boom member and the second boom member can include pivots and/or linkages which allow individual targeting of cutting objects such as limbs. For example, FIG. 8 shows a modified second boom member 16' which includes a pivot P. A linkage L allows the second boom member 16' to pivot in backwards and forwards directions over a range of about 90° as indicated by the arrows about an axis substantially perpendicular to the driving direction of the vehicle. In FIG. 8, the main boom member 10 is a telescoping main boom member.

FIG. 9 shows an embodiment in which the first boom member 12' is modified to include a pivot P allowing the first boom member 12' to pivot backwards and forwards over a range of about 90° in directions indicated by the arrows. A linkage (not shown) can be provided to the first boom member 12' to effect pivoting. FIG. 10 shows another embodiment of the invention, which is similar to that shown in FIG. 1A, which includes jibs 106. As shown in FIG. 10, a pivot P is provided such that both the first and second boom members 12 and 16 can pivot about an axis substantially perpendicular to the driving direction of the vehicle. Although not shown, the linkage 18 (FIG. 3) is provided between the pivot P and the first and second boom members 12 and 16.

Figure 11:
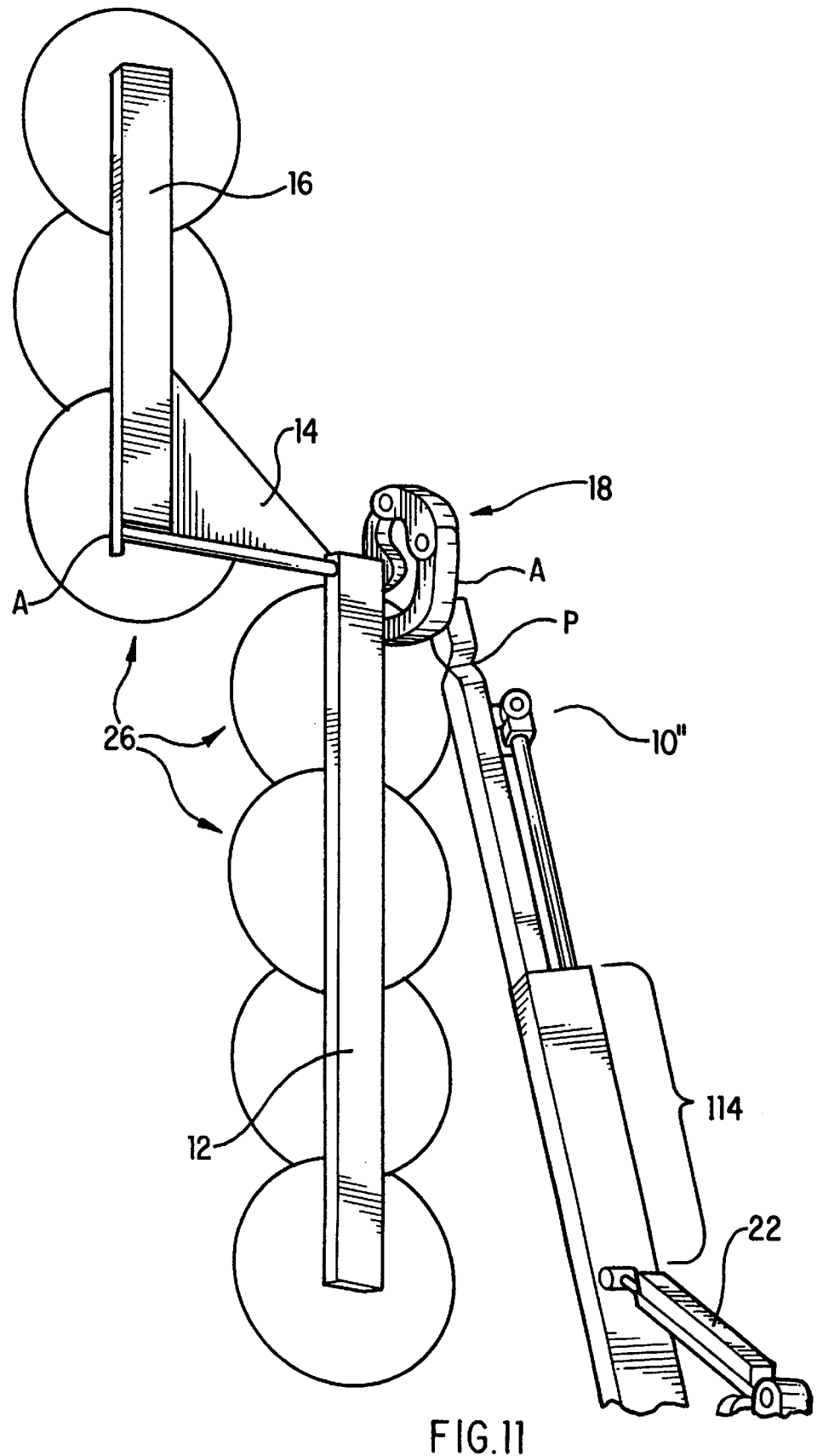

As shown in FIG. 11, the telescoping main boom 10" can include a pivot P located near the distal end of the boom 10" where the linkage 18 is located. The pivot P can be powered by a hydraulic motor, e.g., a ROTAC, to pivot the distal end of the main boom member 10" over a range of from about 180° to about 270° about an axis that is substantially parallel to the driving direction 100 of the vehicle. The pivot P allows the entire assembly of the first and second boom members 12, 16 to pivot towards individual limbs. Of course, the arms can also independently rotate about an axis A, and each arm 12, 16 can additionally pivot, for example, about pivots P as shown in FIGS. 8 and 9.

While the invention has been described in conjunction with specific embodiments outlined above, it is evident that many alternatives, modifications and variations will be apparent to those skilled in the art. Accordingly, preferred embodiments of the invention as set forth above are intended to be illustrative, not limiting. Various changes may be made without departing from the spirit and scope of the invention.

What is claimed is:

1. A hedger comprising:
   a frame;
   a motive device mounted on the frame;
   a platform mounted on the frame adjacent the motive device;
   a main boom member having a first end associated with an industrial implement and a second end pivotably coupled to the platform; and
   tilting structure that tilts the platform about an axis substantially perpendicular to a driving direction of the vehicle.

2. The hedger according to claim 1, further comprising lifting structure that moves the platform between raised and lowered positions with respect to the frame.

3. An industrial vehicle comprising:
   a frame;
   a motive device mounted on the frame;
   a platform mounted on the frame adjacent the motive device;
   a telescoping main boom member associated with an industrial implement, the main boom member being pivotably coupled to the platform and positioned between the platform and the industrial implement;
   at least one secondary boom member attached to the main boom member; and
   at least one pivot defining at least one axis about which at least one of the main boom member and the at least one secondary boom member pivot, the at least one axis being substantially perpendicular to a driving direction of the vehicle.

4. The industrial vehicle according to claim 3, wherein the at least one pivot is provided to said at least one secondary boom member, and only the at least one secondary boom member is pivoted about the at least one axis.

5. The industrial vehicle according to claim 3, wherein the at least one pivot is provided only to said main boom member.

6. The industrial vehicle according to claim 3, wherein the at least one secondary boom member comprises first and second secondary boom members, and the at least one pivot is provided on the main boom member.

7. The industrial vehicle according to claim 3, wherein the at least one secondary boom member comprises first and second secondary boom members, and the at least one pivot is provided on one of the first and second secondary boom members.

8. The industrial vehicle according to claim 7, wherein the at least one pivot allows pivoting of the first and second secondary boom members.

9. The industrial vehicle according to claim 7, wherein the at least one pivot allows pivoting of only one of the first and second secondary boom members.

10. The industrial vehicle according to claim 3, further comprising lifting structure that moves the platform between raised and lowered positions.

11. An industrial vehicle comprising:
    a raisable platform;
    a main boom member associated with an industrial implement, the main boom member being pivotably coupled to the platform and positioned between the industrial implement and the platform;
    at least one secondary boom member connected to the main boom member; and
    a linkage that pivots at least one of the main boom member and the at least one secondary boom member about an axis substantially perpendicular to a driving direction of the vehicle.

12. The industrial vehicle according to claim 11, wherein the linkage is provided on the main boom member.

13. The industrial vehicle according to claim 11, wherein the linkage is provided only on the at least one secondary boom member.

14. The industrial vehicle according to claim 11, wherein the at least one secondary boom member comprises two secondary boom members, and the linkage is provided to only one of said two secondary boom members.

15. The industrial vehicle according to claim 11, wherein only one of the two secondary boom members is pivoted by said linkage.

16. The industrial vehicle according to claim 11, wherein the main boom member is a telescoping main boom member.

17. The industrial vehicle according to claim 11, wherein at least a portion of at least one of the main boom member and the at least one secondary boom member is made from a non-conductive material.

18. The industrial vehicle according to claim 11, further comprising a pivot formed on the main boom that allows the main boom member to pivot about an axis substantially parallel to a driving direction of the vehicle.

19. An industrial vehicle comprising:
    a platform;
    a telescoping main boom member having a proximal end pivotably coupled to the platform;
    at least one secondary boom member connected to a distal end of the main boom member; and
    a pivot positioned on the main boom member between the distal and proximal ends of the main boom member, said pivot allowing the distal end of the main boom member to pivot from a raised position to a lowered position about an axis substantially parallel to a driving direction of the vehicle.

* * * * *